(12) United States Patent
Henry

(10) Patent No.: US 7,690,124 B1
(45) Date of Patent: Apr. 6, 2010

(54) SELF-SUPPORTING STUD FINDER WITH LINE-LASER

(76) Inventor: Bruce Sangeet Henry, 56 Canyon Rd., Fairfax, CA (US) 94930

( * ) Notice: Subject to any disclaimer, the term of this patent is extended or adjusted under 35 U.S.C. 154(b) by 0 days.

(21) Appl. No.: 12/012,453

(22) Filed: Jan. 31, 2008

(51) Int. Cl.
*G01C 15/00* (2006.01)

(52) U.S. Cl. ........................ 33/286; 33/371; 33/DIG. 1; 33/DIG. 21; 324/67

(58) Field of Classification Search .................. 33/286, 33/370, 371, 376, DIG. 1, DIG. 21, 339, 33/342, 347, 349, 351, 353, 354, 285; 324/67; 335/285, 286
See application file for complete search history.

(56) References Cited

U.S. PATENT DOCUMENTS

| | | | | |
|---|---|---|---|---|
| 2,230,010 A * | 1/1941 | Owens | ........................ | 33/489 |
| 3,225,451 A * | 12/1965 | Olexson et al. | ............... | 33/347 |
| 5,531,031 A * | 7/1996 | Green | ........................ | 33/365 |
| 5,966,826 A * | 10/1999 | Ho | .............................. | 33/365 |
| 6,032,376 A * | 3/2000 | Shurtleff | ..................... | 33/391 |
| 6,502,319 B1 * | 1/2003 | Goodrich et al. | ............... | 33/286 |
| 6,594,910 B2 * | 7/2003 | Wishart | ........................ | 33/286 |
| 6,747,536 B1 * | 6/2004 | Miller, Jr. | .................... | 335/285 |
| 6,810,598 B2 * | 11/2004 | Boys | ........................... | 33/528 |
| 6,817,111 B1 * | 11/2004 | Corrado | ........................ | 33/632 |
| 6,914,930 B2 * | 7/2005 | Raskin et al. | ................ | 372/109 |
| 6,968,627 B1 * | 11/2005 | McAllester | .................. | 33/397 |
| 7,086,162 B2 * | 8/2006 | Tyroler | ........................ | 33/277 |
| 7,209,021 B2 * | 4/2007 | Clement | ..................... | 335/285 |
| 7,237,341 B2 * | 7/2007 | Murray | ........................ | 33/286 |
| 7,278,223 B1 * | 10/2007 | Dever et al. | ................... | 33/666 |
| 7,372,771 B2 * | 5/2008 | Park | ............................. | 367/99 |
| 2003/0218469 A1 * | 11/2003 | Brazell et al. | ............... | 324/637 |
| 2004/0237326 A1 * | 12/2004 | Wang | .......................... | 33/760 |
| 2006/0016083 A1 * | 1/2006 | Huang | .......................... | 33/286 |

* cited by examiner

*Primary Examiner*—Amy Cohen Johnson

(57) ABSTRACT

A self-supporting apparatus and method for locating a stud in a wall and providing a hands-free laser-level with visible indication of the stud includes a body and a rare earth magnet attached to the body. A battery-operated laser assembly is attached to the device and emits a laser-line that is visible on a surface of a wall when it is energized. A means for leveling the laser is attached to the body to align or indicate when the laser-line is plumb or disposed at an angle with respect to vertical.

22 Claims, 4 Drawing Sheets

SELF-SUPPORTING STUD FINDER WITH LINE-LASER

BACKGROUND OF THE INVENTION

1. Field of the Invention

The present invention, in general, relates to wall stud finders and, more particularly, to stud finders that include a line-laser.

Stud finders have long been used to locate studs in walls. Typically, the studs are covered with gypsum wall board, also known as sheetrock, or some other type of covering material.

It is important to locate the studs for a variety of purposes, for example, picture hanging and the general fastening of objects to the wall that require a more substantial support base. By locating the position of the stud or studs nearest to the object being secured to the wall, it is possible to anchor the object directly to the stud or studs in the wall. This provides optimally strong support for the object being attached to the wall.

Magnets have been used in a variety of different types of prior art stud finders to locate nail heads that are embedded just below the surface of the sheetrock. The magnet is commonly mounted on a pivot and, as the stud finder is passed over the surface of the wall, the magnet pivots in response to a change in the magnetic force as it passes over a nail (or screw) head. One of the oldest ways to locate a stud is to pass a fixed magnet over the wall and note areas of magnetic attraction when passing over a nail or screw head.

The nails (or screws) are used to secure the sheetrock to the wall. They are driven through the sheetrock and into the studs that are disposed on the opposite side of the sheetrock. Accordingly, by locating a nail it is possible to also identify the location of the stud.

The use of a line laser is also generally known in building construction. The line laser device is typically placed on a tripod in a room and is used to project a vertical line on the wall. The vertical line is typically aligned with the location of a stud, for example, over a nail head that has been previously identified and marked.

Other prior art types of stud finders employ various techniques to locate the edges of a stud in a wall. With these stud finders it is necessary to mark the wall to indicate the location of the stud or the edges of the stud.

It is undesirable to leave a mark on the wall indicating where a stud is located. The mark may show and is unsightly. It requires cleanup and possible painting over the mark.

Other prior art types of devices which are capable of projecting a visible line on the wall and which include a line laser as a part thereof require the use of an adhesive tape or a pair of nails (or other fasteners) to retain the device proximate the wall. The tape, nails, or fasteners that are used to secure these prior art types of devices to the wall also mar the wall's surface. Nails or other fasteners leave visible holes in the wall that must later be spackled, sanded, and repainted. This takes considerable time to accomplish and is not desired.

It also takes time to locate a stud on a wall, mark the location of the stud, and then either scribe a line on the wall or align a line-laser with the mark on the wall.

The line is needed because the location of the stud over at least a portion of its vertical length must be known. This is because the nail that has been found or the mark that is placed on the wall may not be at the ideal vertical elevation for the task at hand, for example at the ideal height for hanging a picture.

The vertical line can, of course, be scribed on the wall by use of a pencil or pen and a level that is held plumb and adjacent to the mark on the wall. The vertical line that is scribed on the wall then indicates the location of the stud. However, the vertical line must then be removed and the surface possibly painted over after the project (i.e., hanging the picture or object) is completed.

It is desirable to provide a device that can locate a stud in a wall and simultaneously define a plumb, vertical orientation and also provide a visible line on the surface of the wall. It is also important that the device does not damage the wall. It is also desirable to be able to secure the device to the wall without the use of tape, nails, or other fasteners. It is especially desirable that the wall not be marked, scratched, or otherwise damaged by the device during its use.

Also, a prior art problem is that a magnet, including a rare earth type of magnet, may not provide enough force to secure a stud finder to a wall by the force of attraction between the magnet and a head of a nail disposed underneath.

This is due, largely to the fact that the depth of the nails is a variable that greatly affects a magnets holding force. The force generally decreases in proportion to the square of the distance. In other words, if a first nail is at a first depth below the gypsum surface and a second nail is at a second depth that is three times as deep below the gypsum surface, then the same magnet will only have about one-ninth the force with the second nail as compared to the first nail.

Accordingly, going from nail to nail or screw to screw it is likely that the magnet will, at times, not be able to support itself and anything else that is attached to the magnet, to the wall. When sheetrock is installed the nails (or screws) that are used to secure the sheetrock to the wall are each driven in a variable amount. Accordingly, a prior art type of magnet may have enough magnetic attraction (i.e., magnetic flux) to secure itself to some of the nails but will fall off of other, deeper nails. As this occurrence will be at random, a user would be frustrated to find that the magnet adheres to the wall only some of the time. When the frequency of adherence falls below a particular threshold amount, the frustration increases to the point where the user simply abandons use of the device.

Also, users often develop a dislike for complex devices that are used to perform relatively simple tasks. The complexity of such a device may cause the user to eventually abandon its use. There is growing appreciation, especially among building contractors, for simple, easy to use, reliable devices whenever possible.

Accordingly, there exists today a need for a self-supporting stud finder with line-laser that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and are not specifically mentioned herein.

Clearly, such an apparatus would be a useful and desirable device.

2. Description of Prior Art

Stud finders and line lasers are, in general, known. For example, the following patents describe various types of these devices:

U.S. Pat. No. 7,287,336 to Goodrich, that issued on Oct. 30, 2007;

U.S. Pat. No. 7,278,218 to Levine, that issued on Oct. 9, 2007;

U.S. Pat. No. 7,269,907 to Levine et al., that issued on Sep. 18, 2007;

U.S. Pat. No. 7,243,433 to Wu, that issued on Jul. 17, 2007;

U.S. Pat. No. 7,237,341 to Murray, that issued on Jul. 3, 2007;

U.S. Pat. No. 7,209,021 to Clement, that issued on Apr. 24, 2007;

U.S. Pat. No. 7,183,885 to Nellessen, Sr. et al., that issued on Feb. 27, 2007;

U.S. Pat. No. 7,181,853 to Heger et al., that issued on Feb. 27, 2007;

U.S. Pat. No. 7,161,343 to Biary, that issued on Jan. 9, 2007;

U.S. Pat. No. 7,013,570 to Levine et al., that issued on Mar. 21, 2006;

U.S. Pat. No. 6,829,834 to Krantz, that issued on Dec. 14, 2004;

U.S. Pat. No. 6,782,034 to Li, that issued on Aug. 24, 2004;

U.S. Pat. No. 6,747,536 to Miller, Jr., that issued on Jun. 8, 2004;

U.S. Pat. No. 6,696,827 to Fazekas et al., that issued on Feb. 24, 2004;

U.S. Pat. No. 6,502,319 to Goodrich et al., that issued on Jan. 7, 2003;

U.S. Pat. No. 6,229,294 to Wun, that issued on May 8, 2001;

U.S. Pat. No. 5,296,806 to Hurl, Jr., that issued on Mar. 22, 1994;

U.S. Pat. No. 5,148,108 to Dufour, that issued on Sep. 15, 1992;

U.S. Pat. No. 4,896,131 to Podlesny et al., that issued on Jan. 23, 1990;

and including Design patents:

U.S. Design Pat. No. D555,017 to Steiner, et al., that issued on Nov. 13, 2007;

U.S. Design Pat. No. D530,232 to Gist, that issued on Oct. 17, 2006; and

U.S. Design Pat. No. D472,164 to Newton, that issued on Mar. 25, 2003.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a self-supporting stud finder with line-laser that adheres automatically to the wall upon locating the stud.

It is also an important object of the invention to provide a self-supporting stud finder with line-laser that adheres to the wall without the use of nails, screws, or adhesives.

Another object of the invention is to provide a self-supporting stud finder with line-laser that includes a level attached thereto.

Still another object of the invention is to provide a self-supporting stud finder with line-laser that includes a line laser attached thereto.

Still yet another object of the invention is to provide a self-supporting stud finder with line-laser that is lightweight.

Yet another important object of the invention is to provide a self-supporting stud finder with line-laser that includes a rare earth magnet.

Still yet another important object of the invention is to provide a self-supporting stud finder with line-laser that uses a rare earth magnet to locate a stud by generating an attraction to a nail or screw in a stud and which uses the attraction to also secure the stud finder to the stud.

A first continuing object of the invention is to provide a self-supporting stud finder with line-laser that includes a non-slip coating that extends over at least a portion of a magnet to increase friction between the magnet and a wall.

A second continuing object of the invention is to provide a self-supporting stud finder with line-laser that includes a non-slip coating that extends over at least a portion of a magnet to increase adherence of the stud finder to a wall.

A third continuing object of the invention is to provide a self-supporting stud finder with line-laser that is modular in construction.

A fourth continuing object of the invention is to provide a self-supporting stud finder with line-laser that is adapted to use any of a variety of different levels.

A fifth continuing object of the invention is to provide a self-supporting stud finder with line-laser that can scribe a line from a line-laser on a wall that is vertical or plumb.

A sixth continuing object of the invention is to provide a self-supporting stud finder with line-laser that can scribe a line from a line-laser on a wall that is horizontal.

A seventh continuing object of the invention is to provide a self-supporting stud finder with line-laser that can scribe a line from a line-laser on a wall that is at a desired angle between horizontal and vertical.

An eighth continuing object of the invention is to provide a self-supporting stud finder with line-laser that helps in locating adjacent studs.

A ninth continuing object of the invention is to provide a self-supporting stud finder with line-laser that includes an overall length that is a fraction of the standard spacing between two vertical studs.

A tenth continuing object of the invention is to provide a self-supporting stud finder with line-laser that includes an overall width that is equal to a width of a stud.

Briefly, a self-supporting stud finder with line-laser that is constructed in accordance with the principles of the present invention has a rare earth magnet attached to a body. A level is attached to the body to indicate when the device is plumb. A battery operated line-laser is attached to the device and emits a laser line that is visible on a surface of a wall.

DETAILED DESCRIPTION OF THE INVENTION

Figure 1:
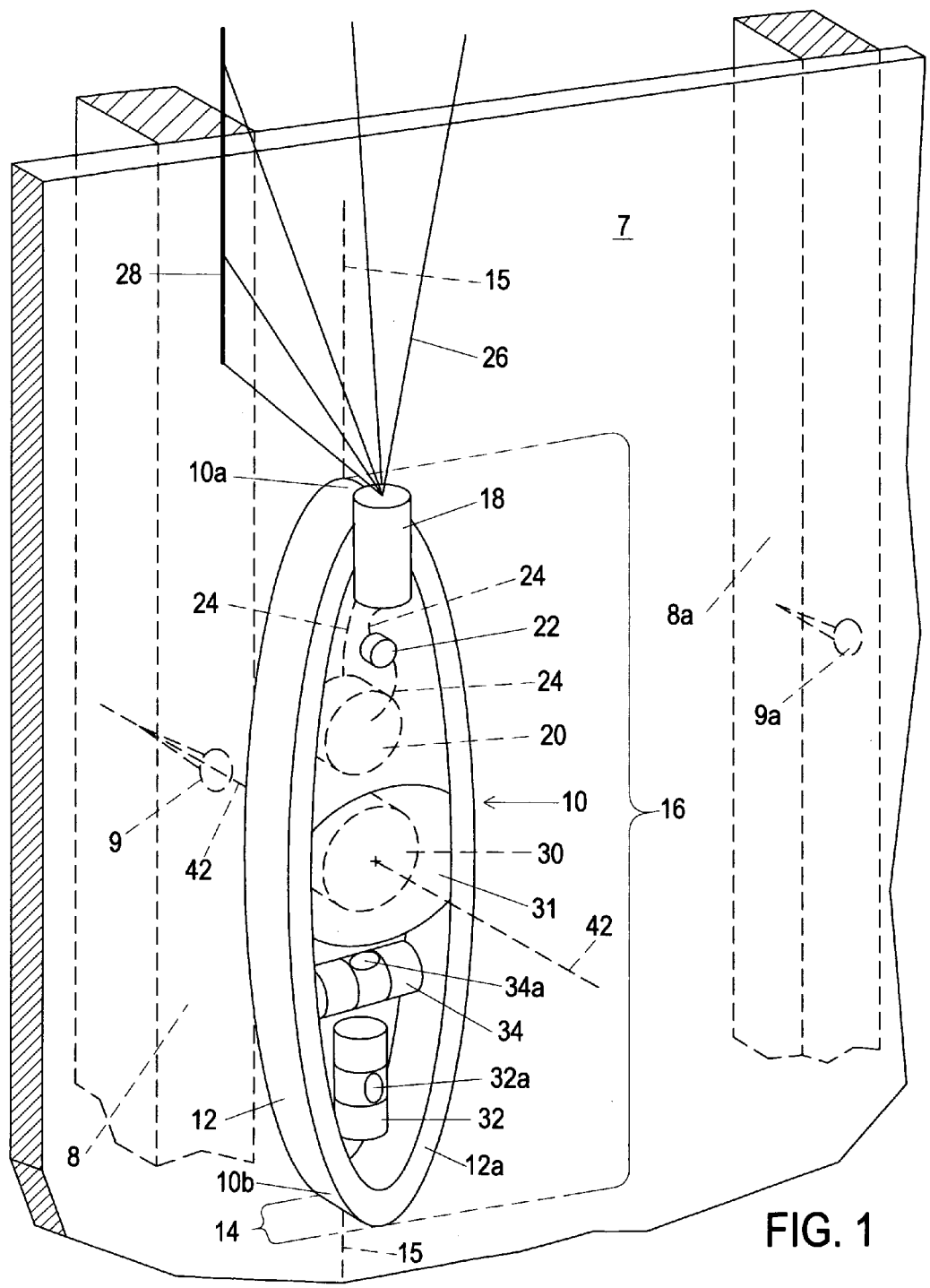
FIG. 1 is a generally top view in perspective of a self-supporting stud finder with line-laser.
Figure 2:
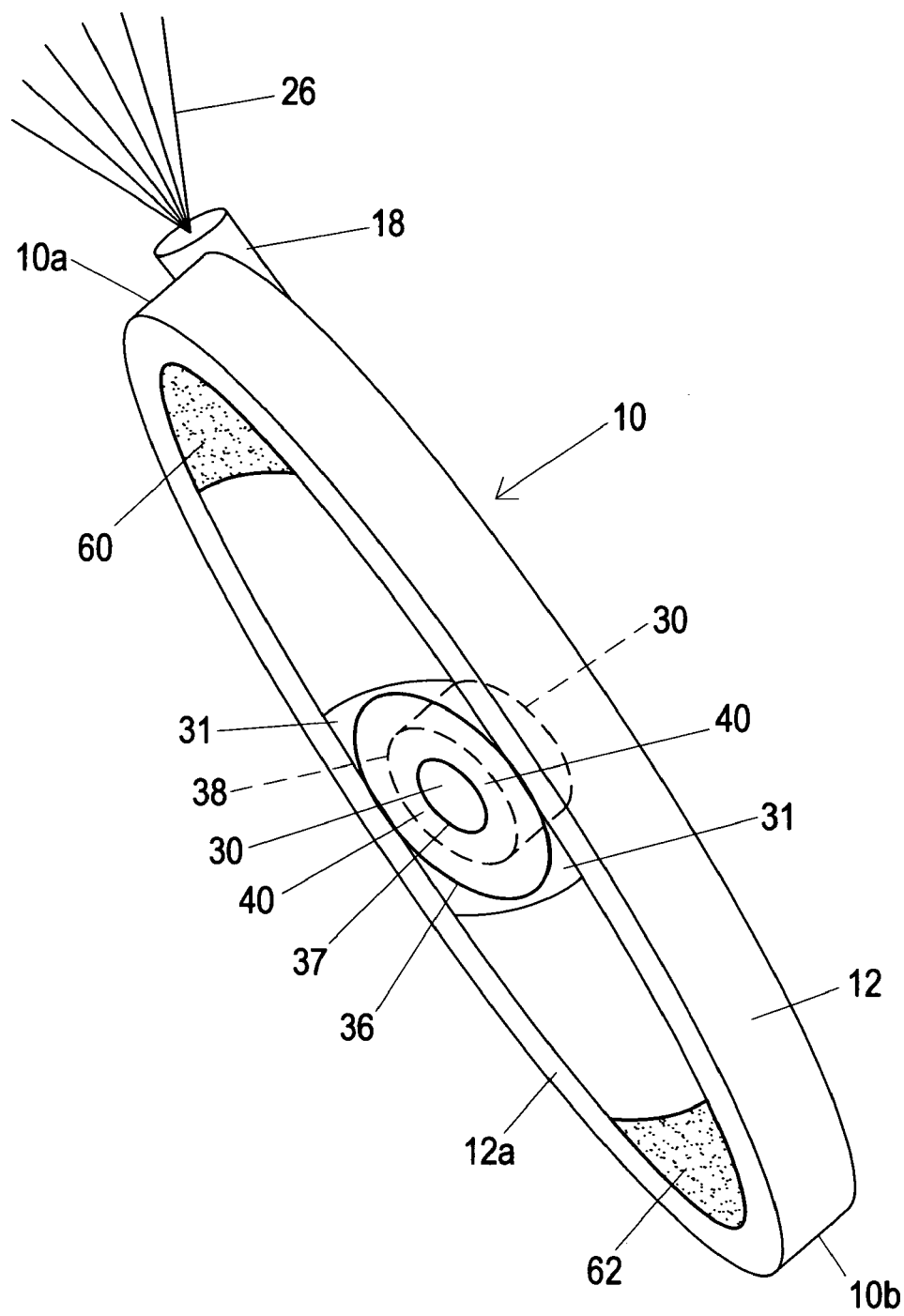
FIG. 2 is a generally bottom view in perspective of a self-supporting stud finder with line-laser of FIG. 1.

Referring to FIG. 1 and FIG. 2 is shown, a self-supporting stud finder with line-laser, identified in general by the reference numeral 10.

A body 12 is preferably formed of a light weight material, such as plastic. Although many materials can be used to form the self-supporting stud finder with line-laser 10, it is especially important to minimize its weight.

A preferred appearance includes a generally oval shape with a thin perimeter wall 12a. The self-supporting stud finder with line-laser 10 includes a depth, identified by bracket 14, sufficient to house the component parts, as described in greater detail hereinafter, that are contained within its body 12.

The body 12 includes an overall length, identified by bracket 16, that is preferably a fraction of the spacing between (i.e., the distance between) two adjacent wall studs centerlines. The overall length extends from a first end 10a to a second end 10b.

A first wall stud 8 is identified by dashed lines that indicate its position. The first wall stud 8 is vertically disposed (i.e., it is plumb) and it is assumed to be disposed approximately one-half of an inch below a surface covering of gypsum wallboard. A fastener 9 is shown in dashed lines and is used to secure the wallboard to the first wall stud 8. A second fastener 9a is used to secure the wallboard to a second wall stud 8a, and also to other adjacent wall studs, not shown. The second wall stud 8a is assumed to be sixteen inches away from and parallel with respect to the first wall stud 8.

Both fasteners 9, 9a are embedded in the wallboard and, as such, indicate the relative position of the wallboard. The wallboard, therefore, provides a covering and a smooth surface that is disposed over the wall studs 8, 8a.

Typical wall framing spaces adjacent wall studs at sixteen-inch intervals. A preferred overall length 16 for the self-supporting stud finder with line-laser 10 is one-third the spacing between adjacent wall studs, or five and one-third inches.

It is, of course, possible for the overall length 16 to be one-half, or eight inches, or if the stud spacing is other than sixteen inches, for example twenty-four inch spacing, it is possible for the overall length 16 to be equal to six or eight inches, as desired.

An important benefit is provided by the preferred spacing and is discussed in greater detail hereinafter.

A longitudinal axis 15 extends through the center of the body 12 along the overall length 16 of the self-supporting stud finder with line-laser 10.

A line laser 18 is attached to the body 12 at the first end 10a. The line laser 18 is powered by a battery 20 that is disposed in the body 12. A removable battery compartment cover, not shown, is used to access and replace the battery 20, as required. Preferably, a light weight battery such as a round, generally coin-shaped battery 20 is used.

An on-off switch 22 is attached to the body 12 near to the line laser 18 and is used to turn the line laser 18 on or off, as desired. Electrical wires 24 (or clad on a printed circuit board, not shown) electrically connect the battery 20, the switch 22, and the line laser 18 together to form an electrical circuit. The on-off switch 22 is visible and accessible when the self-supporting stud finder with line-laser 10 is viewed from the top, as shown in FIG. 1. If desired, the on-off switch 22 could be located along a perimeter side of the body 12.

When the switch 22 is turned on the line laser 18 emits a laser beam 26 that is refracted, spread, or oscillates within a predetermined angular range so as to produce a fan-shaped projection of the laser beam 26 along a plane. While many currently available devices can be used for the line-laser 18, a product called a "Laser Marker" by Central Machinery and sold by Harbor Freight Tools can be used for the line-laser 18. The line laser 18 is attached to the body 12 that that plane of laser beam 26 is perpendicular with respect to a surface upon which the self-supporting stud finder with line-laser 10 is placed and also in alignment with the longitudinal axis 15.

A portion of the laser beam 26 impinges on the surface upon which the self-supporting stud finder with line-laser 10 is placed and reflects off of the surface. The portion of the laser beam 26 that impinges upon the surface appears to scribe a visible laser line 28 on the surface.

The laser line 28 is used to determine the location of the stud, as is described in greater detail hereinafter.

The line laser 18, switch 22, and battery 20 are attached to the body 12, as desired, by the use of internal members (not shown) that connect to an interior of the body 12 and provide sufficient support for the line laser 18, switch 22, and battery 20 while keeping weight to a minimum.

A magnet 30 preferably includes a permanent rare earth magnet with strong flux density (i.e., strong magnetic attraction). A flux density in excess of N40 gauss is preferred. The magnet 30 is secured in position by a surrounding support structure 31. The support structure 31 is attached to an interior of the body 12.

The magnet 30 is disposed in the body 12 so that a bottom plane of the magnet 30 is level with or even slightly below a bottom surface of the body 12. The reason for this is discussed in greater detail hereinafter.

A pair of orthogonally disposed bubble levels includes a first level 32 and a second level 34. The levels 32, 34 are disposed in the body 12 and attached thereto by members (not shown). The levels 32, 34 are visible, including a position of a first and second air bubble 32a, 34a respectively, when the self-supporting stud finder with line-laser 10 is viewed from the top, as shown in FIG. 1.

The first level 32 includes a level longitudinal axis that passes through a center thereof and which aligns with the longitudinal axis 15 of the body 12. The second level 34 includes a second level longitudinal axis that passes through a center thereof and which is perpendicular with respect to the longitudinal axis 15 of the body 12.

The first level 32 is used to orient the self-supporting stud finder with line-laser 10 so that it is in a horizontal attitude (i.e., level with respect to the earth). The second level 34 is used to orient the self-supporting stud finder with line-laser 10 so that it is in a vertical attitude (i.e., plumb). The magnet 30 is used both to locate the wall studs 8, 8a and also to secure the self-supporting stud finder with line-laser 10 to the wall.

Referring now primarily to FIG. 2, a rubber ring 36 is attached to the bottom surface of the self-supporting stud finder with line-laser 10. The rubber ring 36 is circular and planar and it includes an outside diameter that is greater than an outside diameter of the magnet 30.

The rubber ring 36 is attached to the support structure 31 at an outer portion of the rubber ring 36 by an adhesive or other preferred means. The rubber ring 36 includes an opening 37 in the middle thereof.

A location of the outer circumference of the magnet 30 is shown in FIG. 2 by a dashed circle 38. Accordingly, the rubber ring 36 includes an overlap 40 portion that extends over the magnet 30 and which is disposed from the circumference of the magnet 30 to the opening 37 in the rubber ring 36.

A bottom plane of the magnet 30 is parallel with respect to a bottom surface of the self-supporting stud finder with line-laser 10. As mentioned hereinabove, the bottom plane of the magnet 30 is either on the same plane as is the bottom surface of the self-supporting stud finder with line-laser 10 or it can extend slightly below the bottom surface of the self-supporting stud finder with line-laser 10.

In either case, the overlap 40 portion of the rubber ring 36 is disposed slightly below the bottom surface of the self-supporting stud finder with line-laser 10.

During use, the self-supporting stud finder with line-laser 10 is held against the wallboard (i.e., the wall's surface) with light contact pressure and is urged in any preferred pattern over the wallboard.

The rubber ring 36 provides increased friction intermediate the self-supporting stud finder with line-laser 10 and the wall (surface) upon which the self-supporting stud finder with line-laser 10 is placed, but only when the fastener 9, 9a is disposed underneath the magnet 30.

It is important to note that the fasteners 9, 9a are disposed below the visible exterior surface of the wallboard and above the surface of the wall studs 8, 8a. They are embedded into the wallboard when they are inserted into the wall studs 8, 8a. Later, the fasteners 9, 9a are covered with gypsum to hide them from view. The gypsum is then sanded so as to provide a smooth surface and hide the presence, and location, of the fasteners 9, 9a from view.

The depth that the fasteners 9, 9a are embedded into the wallboard (i.e. the depth below the surface) is a variable that normally varies between a minimum and a maximum amount.

With prior art devices, reliance upon a prior art magnet (not shown) to retain any prior art type of device to the wall has proven to be unsatisfactory because of an inability of the prior art magnets to retain the prior art device in position over fasteners 9, 9a that include differing depths. As a result, the prior art devices would fall off the wall and annoy the user to the point of no longer attempting to use the device.

As the self-supporting stud finder with line-laser 10 is urged over the surface in the general area of the first wall stud 8 it eventually will pass over the first fastener 9. At this moment a strong attraction is felt that makes continued urging (moving) of the self-supporting stud finder with line-laser 10 difficult to accomplish.

If a light grip on the self-supporting stud finder with line-laser 10 is employed while generally allowing the self-supporting stud finder with line-laser 10 to descend downward along the wall surface in a serpentine pattern, when the magnet 30 passes over the first fastener 9 and the magnetic attraction force is experienced, the self-supporting stud finder with line-laser 10 is automatically retained in position proximate the first fastener 9. A light grip force causes the hand to effortlessly release its hold on the self-supporting stud finder with line-laser 10 and continue naturally in a downward direction. This preferred technique optimizes use of the self-supporting stud finder with line-laser 10.

The user then stops further movement of the self-supporting stud finder with line-laser 10 when the force is perceived as being at its strongest. The user then releases contact with the self-supporting stud finder with line-laser 10. As the magnet 30 attempts to draw itself and the remainder of the self-supporting stud finder with line-laser 10 toward the first fastener 9, the overlap 40 portion is pinched between the magnet 30 and the wall's surface.

Accordingly, the overlap 40 portion bears tightly upon the surface of the wall. The rubber ring 36 includes a high coefficient of static friction with respect to the wall's surface. Therefore, for any given magnetic attraction force that is experienced between the self-supporting stud finder with line-laser 10 and the first fastener 9, an increase in holding power is also experienced.

If desired, the rubber ring 36 can include materials that are made of substances other than rubber if they provide the desired increase in the static coefficient of friction. Any preferred elastomer, fabric, or other type of material can similarly be used.

In other words, the self-supporting stud finder with line-laser 10 is able to secure and retain itself directly over the first fastener 9 regardless of how the depth of the first fastener 9 varies between the minimum and the maximum amount. This makes the self-supporting stud finder with line-laser 10 much easier and more practical to use.

Once the self-supporting stud finder with line-laser 10 is secured to the wall over the first fastener 9, it is rotated about a center longitudinal magnet axis, as shown by dashed line 42 of FIG. 1, until the second air bubble 34a is disposed in the center of the second level 34. Once this occurs, the longitudinal axis 15 will be plumb.

The on-off switch 22 is used to turn the line laser 18 on and the laser line 28 is used to indicate the center of the first wall stud 8. Any type of desired wall hanging fastener (not shown) is then secured to the first wall stud 8 by the use of an additional fastener (not shown) that is placed over the laser line 28 and which is urged through the wallboard and into the first wall stud 8. When the laser line 28 is no longer needed, the on-off switch 22 is set to off to conserve and extend the life of the battery 20.

If the user is desirous of a horizontal line rather than a vertical line, the self-supporting stud finder with line-laser 10 is rotated about the center longitudinal magnet axis 42 until the first bubble 32a is disposed in the center of the first level 32. The line laser 18 is energized and the resultant laser line 28 now indicates a level horizontal line extending from the location of the first fastener 9.

If the first fastener 9 is not located at exactly the correct elevation, the horizontal line is used and a desired offset is measured from the laser line 28, either up or down, to provide indication of a desired height above a floor, for example.

It is important to note that several advantages are provided by the self-supporting stud finder with line-laser 10. No fastener is required to secure the self-supporting stud finder with line-laser 10 to the wall. The same means that are used to locate the position of the first wall stud (i.e., the magnet 30) is also the same means used to retain the self-supporting stud finder with line-laser 10 to the wall.

Speed of use is maximized by merely locating the position of the first fastener 9, releasing the self-supporting stud finder with line-laser 10 so that it is urged toward and automatically retained proximate the first fastener 9, rotating it until a level or plumb attitude is attained, and then energizing the line laser 18.

It is also important to note that no markings of any kind are placed on the wall. The laser line 28 is used to temporarily indicate a line that appears to be scribed on the wall. However, the moment the line laser 18 is de-energized, the laser line 28 disappears without affect to the wall's surface. This allows easy use of the self-supporting stud finder with line-laser 10 on painted walls or those covered with wallpaper as no holes for fasteners to secure the device and no markings on the wall are needed.

Once the location of the first stud 8 has been found by the self-supporting stud finder with line-laser 10 it is quick and easy to locate adjacent wall studs, for example, the second stud 8a. To locate an adjacent wall stud the self-supporting stud finder with line-laser 10 is placed in a horizontal attitude with either the first or second end (10a or 10b) located in the approximate center of the first stud 8.

Assuming that first end 10a is placed on the first wall stud 8, the position on the surface of the wall where second end 10b is temporarily located is noted, either visually or by making a slight mark on the wall. The self-supporting stud finder with line-laser 10 is then offset to the right if locating the next adjacent wall stud 8a to the right (or to the left, if locating the next adjacent stud to the left [not shown]) so that the first end 10a is now disposed where the second end 10b previously was.

This process is repeated one more time if the overall length of the self-supporting stud finder with line-laser 10 is equal to one-third the wall stud spacing. After the second offset is accomplished the location of second end 10b will be at the approximate center of the next adjacent wall stud 8a to the right.

The user can then place a mark, if desired, or the user can move the self-supporting stud finder with line-laser 10 generally up and down and around the location until another embedded nail has been found, in the manner as was previously described. The self-supporting stud finder with line-laser 10 is then placed so that the longitudinal axis 15 thereof is plumb and, as desired, the on-off switch 22 is turned on to scribe the laser line 28 on the wall over the second wall stud 8a. The user then secures whatever type of hanging fastener (not shown) is desired to be secured to the second wall stud 8a anywhere along the length of the laser line 28.

Figure 3:
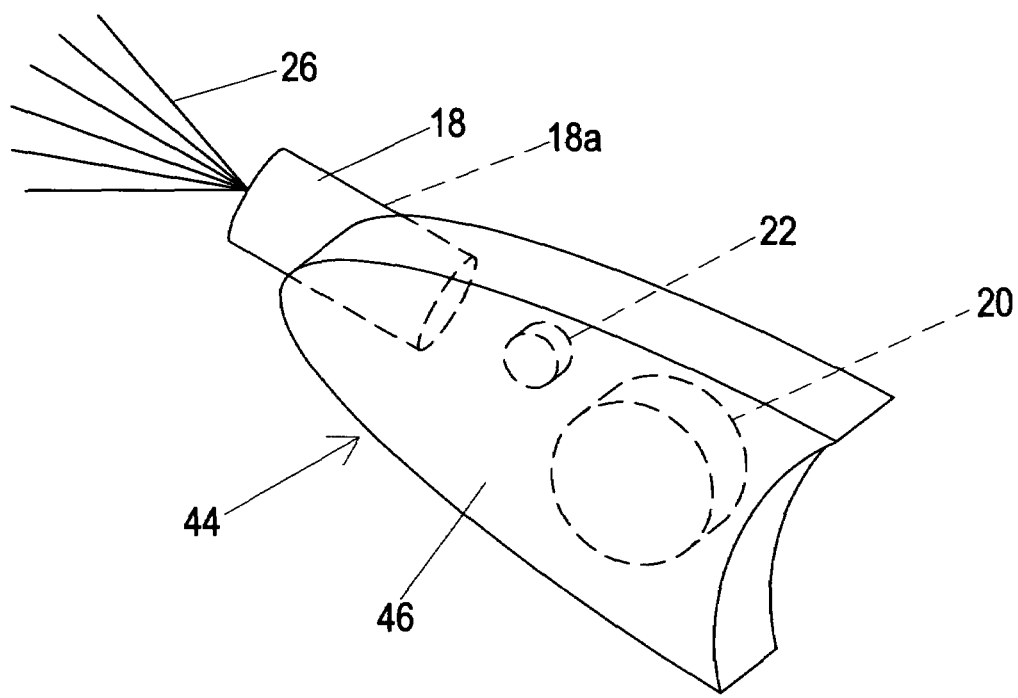
FIG. 3 is a generally bottom view in perspective of a modular replacement laser assembly for the self-supporting stud finder with line-laser of FIG. 1.

Numerous other modifications and changes are also possible. Referring now to FIG. 3, it is preferable to use modular construction whereby various component parts of the self-supporting stud finder with line-laser 10 can be easily replaced, when needed, or upgraded.

A replacement laser assembly, identified by the reference numeral 44, includes a center body 46 that fits in the space between an interior of the body 12 and the supporting structure 31 on the side that is closest to the first end 10a. The center body 46 of the replacement laser assembly 44 snaps into place to replace an existing laser assembly when the battery 20 loses its charge (if, for example, the battery 20 is not replaceable) or if any other component of the replacement laser assembly 44 (i.e., the line laser 18, on-off switch 22, and battery 20) should fail.

It is also possible to modify the replacement laser assembly 44 to include a modified laser, shown by dashed line and indicated by reference numeral 18a. The modified laser 18a can include any preferred type of laser and does not have to be a line type of laser.

For example, a distance measuring laser (with display) can be used as the modified laser 18a. The self-supporting stud finder with line-laser 10 can then be used to measure the distance from itself to other objects which is useful in construction and various building projects.

If preferred, a brighter or other type of modified line laser can be included in the replacement laser assembly 44 as the modified laser 18a. Self-leveling lasers that include a weighted pendulum that pivots the laser about an axis are known. It is possible to use a self-leveling laser as the modified laser 18a. It is similarly possible to use two lasers that are orthogonal with respect to each other as the modified laser 18a. If preferred, the two lasers can be of the self-leveling type. Accordingly, the self-supporting stud finder with line-laser 10 can be upgraded or modified to perform other functions by the use of the replacement laser assembly 44.

Figure 4:
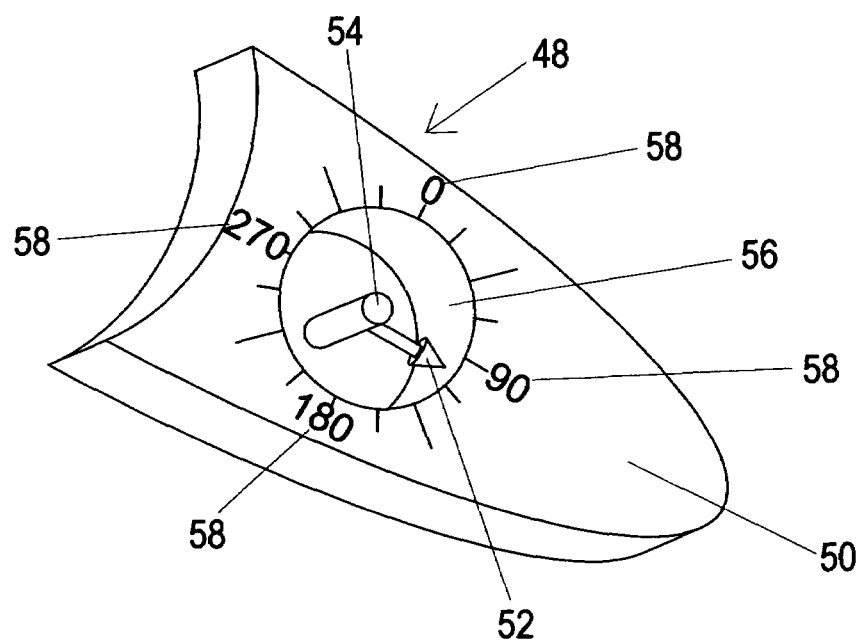
FIG. 4 is a generally top view in perspective of a modular replacement level assembly for the self-supporting stud finder with line-laser of FIG. 1.

Referring now to FIG. 4, a replacement level assembly, identified by the reference numeral 48, includes a center level body 50 that fits in the space between an interior of the body 12 and the supporting structure 31 on the side that is closest to the second end 10b.

A weighted plumb 52 is pivotally attached to an axle 54 that extends through a visible circular opening 56 in the replacement level assembly 48. A pair of clear plastic panels are each disposed on opposite sides of the replacement level assembly 48. Opposite ends of the axle 54 are each secured to one of the plastic panels, respectively.

The plumb 52 preferably includes the shape and appearance of an arrow with the weighted end of the plumb 52 being disposed at an arrow tip. Degree markings 58 are provided on the center level body 50 around the circumference of the visible circular opening 56 and are used to indicate the attitude of the self-supporting stud finder with line-laser 10 with respect to true level.

As shown, a ninety degree and a two-hundred and seventy degree mark both align with the longitudinal axis of the self-supporting stud finder with line-laser 10. Accordingly, when the plumb 52 is pointing to either of these marks the self-supporting stud finder with line-laser 10 will be vertical (i.e., plumb) and the laser line 28 can be used to indicate the position of the vertical first stud 8 or the second stud 8a.

Similarly, if the plumb 52 is pointing towards either the zero or the one-hundred and eighty degree marks, the longitudinal axis 15 of the self-supporting stud finder with line-laser 10 will be horizontal. The laser line 28 can then be used to scribe a horizontal line on the wall.

The weighted plumb 52 of the replacement level assembly 48 provides another benefit not readily available with the bubble levels 32, 34.

Intermediate degree markings are also preferably provided between the degree markings 58 and are used to indicate deviations away from level or vertical. For example, a forty-five degree intermediate degree marking can be used to orient the self-supporting stud finder with line-laser 10 at a forty-five degree angle to the right of vertical and therefore, to scribe the laser line 28 at a forty-five degree angle with respect to vertical.

The remaining intermediate degree markings can be similarly used to orient the self-supporting stud finder with line-laser 10 at any angular position around the center longitudinal magnet axis 42 and therefore to scribe the laser line 28 at any desired angle on the wall.

This opens up a vast array of interior decorating options. For example, the angled laser line 28 can be used to indicate where a plurality of spaced-apart pictures, each picture being disposed on the same ascending or descending angle, are to be disposed.

Figure 5:
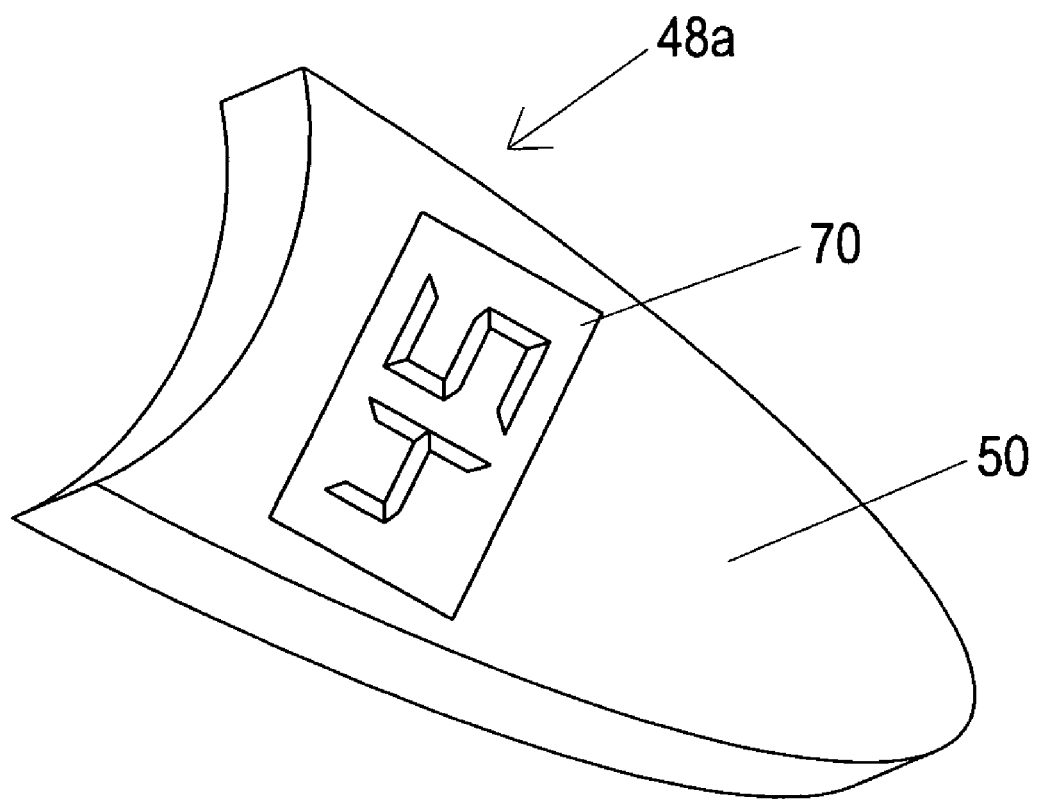
FIG. 5 is a view in perspective of a modular modified replacement level assembly for the self-supporting stud finder with line-laser that is substantially identical to FIG. 4 and which instead includes a digital type of level.

Referring now to FIG. 5, a modified replacement level assembly, identified by the reference numeral 48a includes a digital type of level 70 that can be substituted for the weighted plumb 52.

It is also, of course, possible to use any preferred shape for the self-supporting stud finder with line-laser 10 other than oval. For example, a rectangular shape is also possible as are infinite other possible shapes. If desired, a plurality of magnets can be used for the magnet 30. If desired, a swivel base (not shown) can be included to allow easy rotation of the self-supporting stud finder with line-laser 10 about the longitudinal magnet axis.

Referring again momentarily to FIG. 2, if desired, a front non-skid friction enhancing member 60 can be attached to a bottom of the self-supporting stud finder with line-laser 10 away from the magnet 30 and preferably toward the first end 10a. Similarly, a rear non-skid friction enhancing member 62 can be attached to a bottom of the self-supporting stud finder with line-laser 10 preferably toward the second end 10b.

The front and rear non-skid friction enhancing members 60, 62 are formed of any preferred material that increases the coefficient of friction between a bottom of the self-supporting stud finder with line-laser 10 and the wall surface. Rubber, elastomers, and other materials may be used to form either of the front and rear non-skid friction enhancing members 60, 62.

The front and rear non-skid friction enhancing members 60, 62 provide better adherence of the self-supporting stud finder with line-laser 10 to the wall surface, especially if the self-supporting stud finder with line-laser 10 is not balanced in weight from side to side with respect to its geometric center. The front and rear non-skid friction enhancing members 60, 62 help prevent the self-supporting stud finder with line-laser 10 from rotating about the center longitudinal magnet axis 42.

The front and rear non-skid friction enhancing members 60, 62 are not disposed over the magnet. As such, they serve to well-illustrate a possible modification for the rubber ring 36. It is possible to modify the rubber ring 36 so that it is disposed adjacent to but not overlapping a bottom surface of the magnet 30, providing that a plane that the rubber ring 36 is disposed on is offset with respect to the bottom surface of the magnet 30.

In other words, if the magnet 30 is recessed slightly in the self-supporting stud finder with line-laser 10 with respect to the rubber ring 36, the magnet 30 will supply a force that urges the self-supporting stud finder with line-laser 10 closer toward the wall than the rubber ring 36 allows, thereby urging (i.e., pinching) the rubber ring 36 between the self-supporting stud finder with line-laser 10 and the wall. In this manner the rubber ring 36 provides a similar increase in the coefficient of friction. Accordingly, the self-supporting stud finder with line-laser 10 will better adhere to the wall during use.

The rubber ring 36, according to this modification, includes an inside diameter that is greater than the outside diameter of the magnet 30 and is disposed concentrically around the magnet 30. Rubber, elastomer, or any other preferred friction-enhancing material may be used to form the modified rubber ring 36, as previously described. Also, if desired, any version of the rubber ring 36 can include a shape that is other than circular.

The rubber ring 36 or the front and rear non-skid friction enhancing members 60, 62 also provide an additional unexpected benefit. They prevent the magnet 30, which has a hard surface, from contacting the wall and thereby prevent scratching of the wall surface.

Also, with regard to the strength of the magnet 30, a grading of N40 is equal to 40 millions Gauss Oersted (40 MGOe), which is the maximum strength that the magnet can be magnetized to. The "N" rating refers to the "Maximum Energy Product" of the material the magnet is made from. The preferred magnet 30 is a neodymium magnet and it is generally measured in units that are in millions of Gauss Oersted (MGOe). Therefore, a magnet grade of N40 or greater, as preferred, has a Maximum Energy Product of 40 million gauss Oersted (40 MGoe) or greater.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A self-supporting stud finder with line-laser for locating a wall stud, comprising:
    a housing frame body, said housing frame body consisting of;
    a magnet attached to said housing frame body;
    a line-laser assembly attached to said housing frame body; and
    means for leveling said line-laser assembly attached to said housing frame body;
    wherein said magnet includes a magnetic strength that is sufficient to locate a ferrous fastener that is attached to a wall stud that is disposed in a wall, and wherein said strength of said magnet includes a magnetic flux density between the fastener and said magnet that is sufficient to retain said stud finder in position over the fastener and adjacent to the wall, and wherein said housing frame body is adapted to be rotated about a longitudinal magnet axis of said magnet when said stud finder is retained adjacent to the wall and over the fastener, and wherein said line-laser assembly, when energized, projects a visible laser line on a wall surface in a predetermined direction extending away from said housing frame body.

2. The self-supporting stud finder with line-laser of claim 1 wherein said predetermined direction is plumb.

3. The self-supporting stud, finder with line-laser of claim 1 wherein said predetermined direction is horizontal.

4. The self-supporting stud finder with line-laser of claim 1 wherein said predetermined direction is at an angle that is other than horizontal or vertical.

5. The self-supporting stud finder with line-laser of claim 1 wherein said line-laser assembly emits a laser beam, and wherein said laser beam extends from said line-laser assembly along an arc, and wherein said arc is disposed on a plane.

6. The self-supporting stud finder with line-laser of claim 5 wherein a portion of said laser beam impinges on a wall surface to scribe a laser line thereon.

7. The self-supporting stud finder with line-laser of claim 1 wherein said means for leveling said line-laser assembly includes a bubble level.

8. The self-supporting stud finder with line-laser of claim 7 wherein said bubble level includes a first bubble level and a second bubble level, and wherein said first bubble level indicates when a longitudinal axis of said self-supporting stud finder with line-laser is horizontal and wherein said second bubble level indicates when a longitudinal axis of said self-supporting stud finder with line-laser is vertical.

9. The self-supporting stud finder with line-laser of claim 1 wherein said means for leveling said line-laser assembly includes a digital level.

10. The self-supporting stud finder with line-laser of claim 1 including a battery and an on-off switch attached to said housing frame body.

11. The self-supporting stud finder with line-laser of claim 1 wherein said housing frame body includes a modular structure, and wherein said modular structure permits the replacement or upgrading of various component parts of said self-supporting stud finder with line-laser.

12. The self-supporting stud finder with line-laser of claim 11 wherein said magnet is permanently attached to said housing frame body and wherein said line-laser assembly is removably attached to said housing frame body.

13. The self-supporting stud finder with line-laser of claim 12 wherein said line-laser assembly includes an on-off switch.

14. The self-supporting stud finder with line-laser of claim 11 wherein said magnet is permanently attached to said body and wherein said means for leveling said line-laser assembly is removably attached.

15. The self-supporting stud finder with line-laser of claim 1 wherein said line-laser assembly is a modified laser and wherein said modified laser is adapted to measure the distance an object is disposed away from said self-supporting stud finder with line-laser.

16. The self-supporting stud finder with line-laser of claim 1 wherein said means for leveling includes a weighted plumb that is adapted to rotate about an axis and including degree markings that are disposed around a circumference of an opening in which said plumb is disposed.

17. The self-supporting stud finder with line-laser of claim 16 wherein said plumb is able to indicate when a longitudinal axis of said self-supporting stud finder with line-laser is disposed at a vertical angle, a horizontal angle, or at an angle that is other than vertical or horizontal.

18. The self-supporting stud finder with line-laser of claim 1 including a friction increasing material that is disposed proximate said magnet.

19. The self-supporting stud finder with line-laser of claim 18 wherein said friction increasing material includes a rubber ring, and wherein a portion of said rubber ring is attached to said housing frame body and wherein a portion of said rubber ring is disposed over said magnet.

20. The self-supporting stud finder with line-laser of claim 1 wherein said housing frame body includes a non-skid friction enhancing member attached to a bottom surface thereof and disposed away from a geometric center of said self-supporting stud finder with line-laser.

21. The self-supporting stud finder with line-laser of claim 1 wherein said means for leveling said line-laser assembly includes a self-leveling pendulum that pivots said line-laser assembly about an axis into said predetermined direction.

22. A method of finding and visibly displaying a stud location in a wall over an extended distance, comprising:
   moving a device having a housing frame body consisting of a magnet attached to said housing frame body, a line-laser assembly attached to said housing frame body, and a means for leveling said line-laser assembly attached to said housing frame body, along a wall surface;
   coming into proximity of a ferrous fastener that is attached to a wall stud that is disposed in said wall;
   having said magnet magnetically engage said ferrous fastener; and
   holding said device in position over said ferrous fastener against said wall solely by the magnet attached to said housing frame body;
   utilizing said means for leveling said line-laser assembly to direct the said line-laser assembly in a vertical direction;
   energizing said line-laser assembly thereby projecting a visible vertical laser line on the wall surface, displaying the stud location over an extended distance.

* * * * *